United States Patent [19]

Ellis et al.

[11] Patent Number: 4,968,333
[45] Date of Patent: Nov. 6, 1990

[54] APPARATUS FOR CLEANING HEATING, VENTILATION, AND AIR CONDITIONING SYSTEMS

[76] Inventors: James D. Ellis, 6223 Halifax Ave. S., Minneapolis, Minn. 55424; Douglas D. Groen, 913 Cortland Dr., Apple Valley, Minn. 55124; Kenneth W. Witte, 20555 Italy Ave. W., Lakeville, Minn. 55044

[21] Appl. No.: 263,409

[22] Filed: Oct. 27, 1988

[51] Int. Cl.$^5$ .............................................. B01D 46/00
[52] U.S. Cl. .................................... 55/341.1; 55/350; 55/356; 55/473; 55/484; 15/340.1
[58] Field of Search ...................... 55/341.1, 356, 350, 55/379, 473, 484; 15/340.1

[56] References Cited

U.S. PATENT DOCUMENTS

| 3,926,596 | 12/1975 | Coleman | 15/340.1 |
| 4,017,281 | 4/1977 | Johnstone | 55/341.1 |
| 4,306,893 | 12/1981 | Fernando | 55/379 |
| 4,590,884 | 5/1986 | Kreeger et al. | 55/356 |
| 4,935,984 | 6/1990 | Bryant et al. | 15/340.1 |

Primary Examiner—Bernard Nozick

[57] ABSTRACT

An apparatus for cleaning ducts for heating, ventilation, and air conditioning systems in a building includes a portable primary filter unit and a portable blower and final filter unit. The contaminant material is first loosened in the ducts and is entrained in a stream of air produced by the blower and final filter unit at a vacuum of approximately 4,000 cfm. The air entrained contaminants are passed upwardly through cylindrical filter elements in the primary filter unit where over 90% of the contaminants are removed. The partially contaminated stream is then directed into a fan chamber in the blower and final filter unit, and is then directed through a high efficiency particulate air filter where the remaining contaminants are removed before being discharged into the interior of the building.

6 Claims, 4 Drawing Sheets

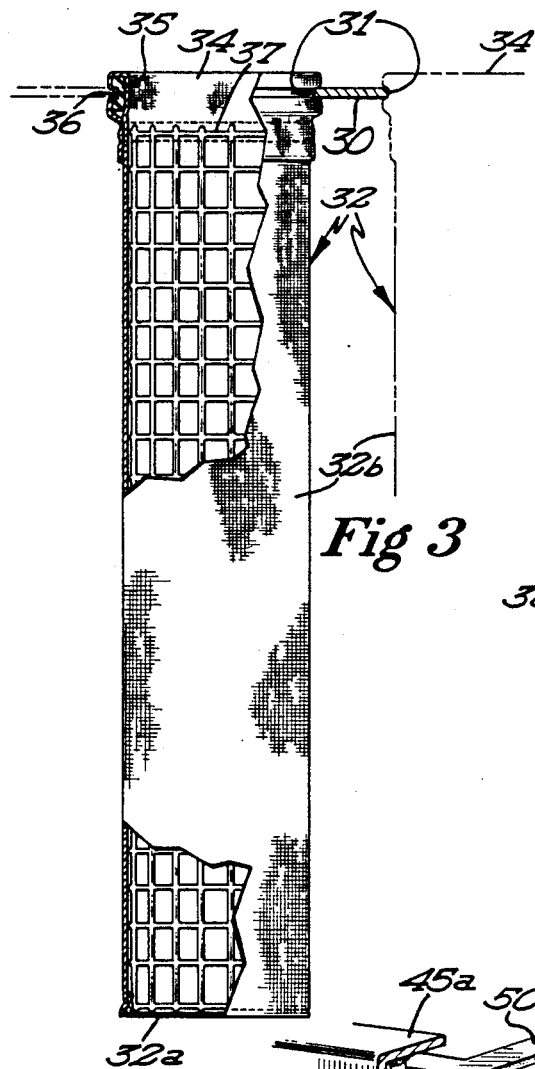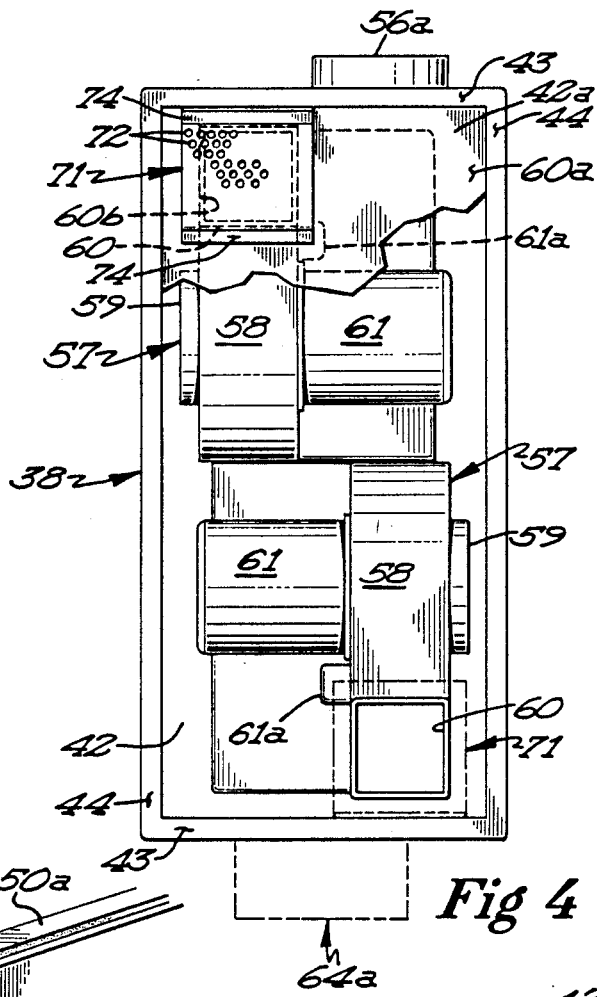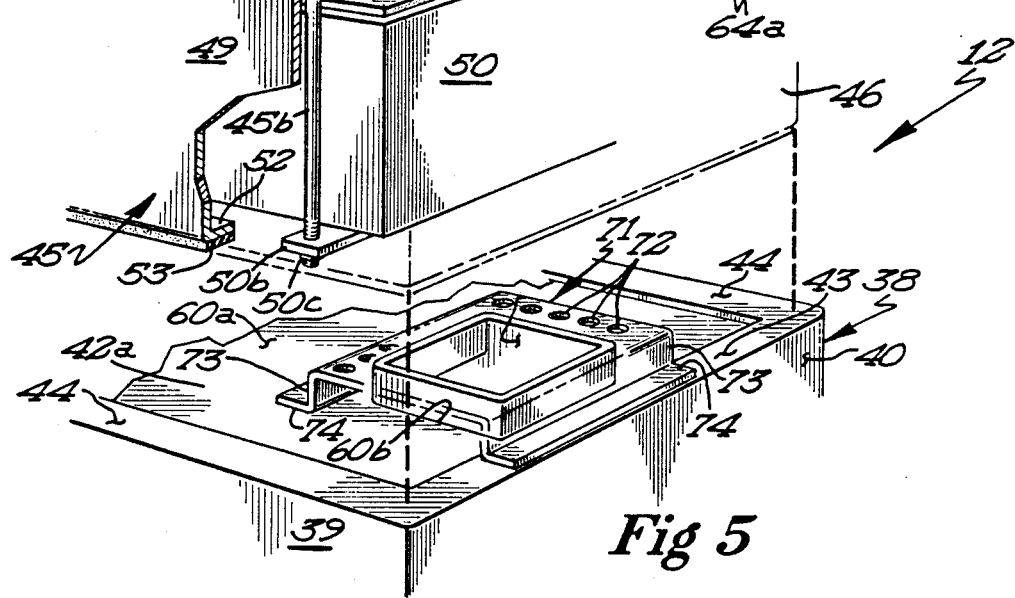

APPARATUS FOR CLEANING HEATING, VENTILATION, AND AIR CONDITIONING SYSTEMS

FIELD OF THE INVENTION

This invention relates to a cleaning system and, more particularly, to a process and apparatus for cleaning the ducts of heating, ventilation, and air conditioning systems of buildings.

BACKGROUND OF THE INVENTION

Many of the commercial buildings built in the 1970's and thereafter were constructed to reduce energy consumption because of the high cost of energy. As a result, such buildings did not have windows that opened and closed, and had to rely on indoor air that was filtered and recirculated through heating, ventilation, and air conditioning systems. The extensive ducts used in these systems would not only become dirty from entrained impurities, but the warm, moist environments defined by the interior of these ducts provided optimum conditions for the growth of debris, particulates, asbestos fibers, pathogens, fungi, and the like. These pathogens and fungi become entrained in the circulating air and are subsequently inhaled by tenants and persons in the buildings.

Public awareness of these problems has resulted in building owners and landlords developing policies that require periodic cleaning of the air handling systems. Some commercial cleaning apparatuses are extremely bulky and heavy in order to clean air handling ducts located at points remote from the blower systems. For example, while commercial cleaning equipment located on the ground floor may be effective in cleaning the air ducts in the lower floors of a building, it is difficult for this equipment to effectively clean the air ducts in the upper floors because of the great length of the suction hoses required to reach these higher floors. Further, this kind of commercial cleaning equipment requires extremely large blowers in order to generate the vacuum needed to clean the remotely located air ducts. Some present commercial cleaning equipment is much too large to be transported by elevators to each floor of the building, and the cleaning components are usually located at points remote from the ducts to be cleaned. Other portable-type equipment simply does not have the means for producing the necessary air volume to effectively clean duct systems of commercial heating, ventilating, and air conditioning systems of commercial buildings and the like.

SUMMARY OF THE INVENTION

It is an object of this invention to provide a novel process and apparatus for cleaning the ducts of heating, ventilation, and air conditioning systems of commercial buildings, hospitals, and the like.

Another object of this invention is to provide a process for cleaning the ducts of heating, ventilation, and air conditioning systems of buildings, wherein the interior of the ducts to be cleaned is subjected to the steps of loosening the contamination by air jets, removing the particles by means of a vacuum which entrains the materials in the air stream, passing the air entrained particles through a primary filter system and through a fan housing, and thereafter through a final filter system for discharging the cleaned air into the building.

Another object of this invention is to provide a portable apparatus for cleaning ducts of heating, ventilation, and air conditioning systems of buildings, which includes a primary filter unit for initially removing particles entrained in the air, and a secondary blower and final filter unit for removing debris, particulates, asbestos fibers, pathogens, fungi, and the like.

In carrying out this invention, a portable primary filter unit is provided, having a plurality of vertically disposed cylindrical filter units therein through which the air to be cleaned is directed by means of a vacuum hose. The primary filter unit is connected by a vacuum hose to a portable blower and final filter unit, which contains a pair of blower devices arranged in parallel, and which produces the vacuum in the system. After the air entrained particles have been removed in the primary filter unit, the air is passed through the blower chamber and is finally discharged through a final filter unit, which is effective in removing extremely small particles, debris, particulates, asbestos fibers, pathogens, fungi, and the like from the air before the air is discharged into a room.

These and other objects of the invention will be more fully defined in the following Specification.

FIGURES OF THE DRAWING

FIG. 3 is a cross-sectional view taken along the lines 3—3 of FIG. 2 and looking in the direction of the arrows;

FIG. 4 is a top view taken approximately along the lines 4—4 of FIG. 2 and looking in the direction of the arrows;

FIG. 5 is a partially exploded view of the apparatus depicting components and blower and final filter unit;

DESCRIPTION OF THE PREFERRED EMBODIMENT

Figure 1:
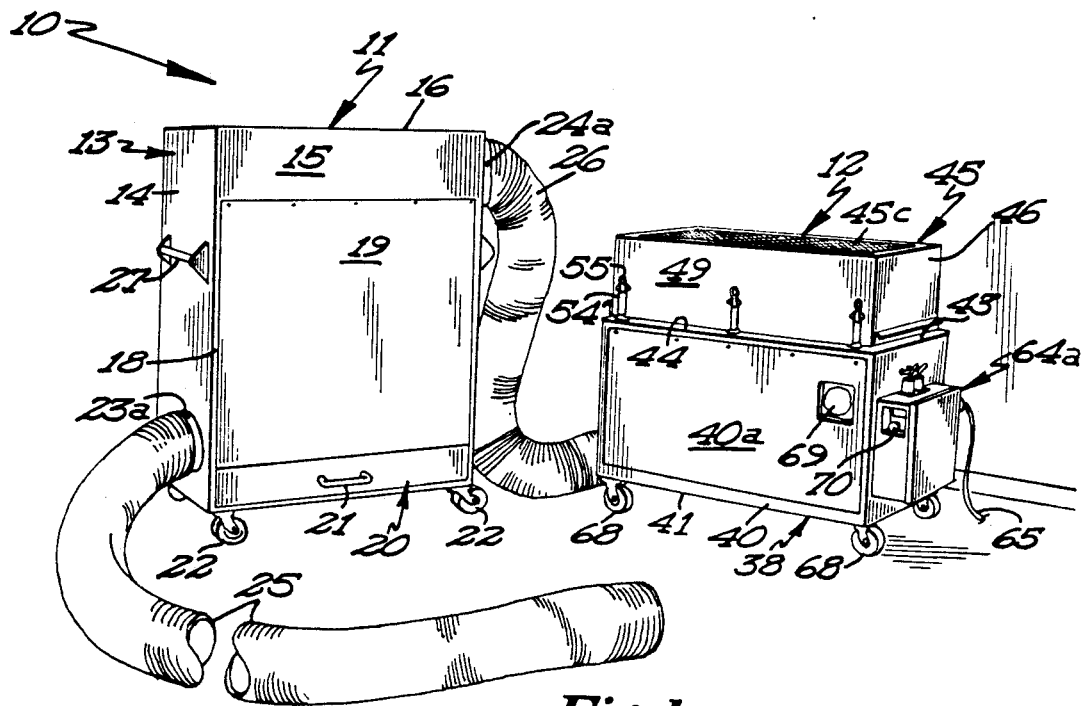
FIG. 1 is a perspective view of the novel apparatus used in carrying out the novel method of the present invention.
Figure 2:
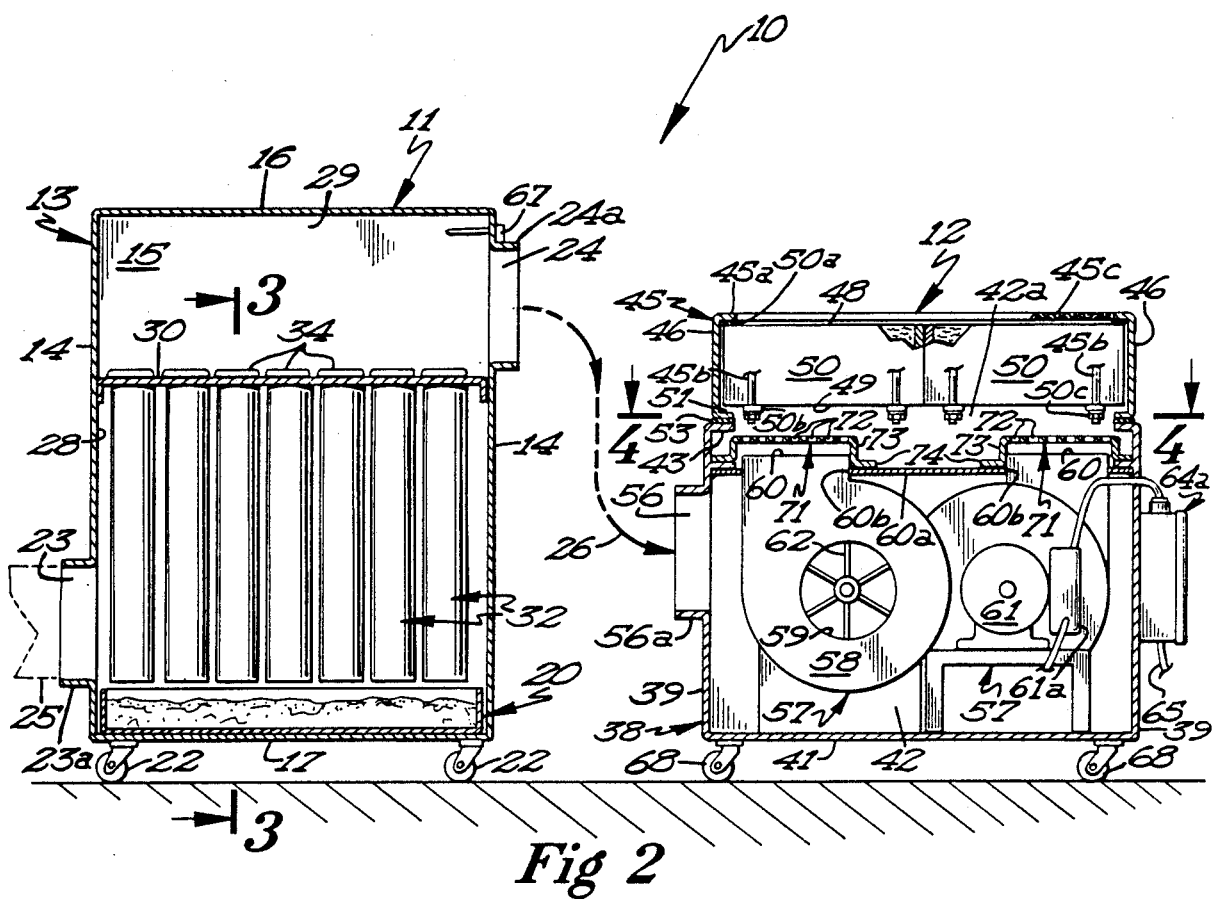
FIG. 2 is a diagrammatic cross-sectional view of the apparatus shown in FIG. 1 and illustrating the details of construction thereof.

Referring now to the drawings and, more specifically, to FIGS. 1 and 2, it will be seen that the novel duct cleaning apparatus, designated generally by the reference numeral 10, is thereshown. The duct cleaning apparatus 10 includes a primary filter unit 11 and a blower and final filter unit 12. It will be noted that the primary filter unit 11 and the blower and final filter unit 12 are both portable and are of a size to fit into the bed of a full-size pick-up truck and into the conventional passenger elevator of a commercial building, hospital, or like structure.

The primary filter unit 11 includes a filter housing 13, preferably formed of aluminum, which is of generally rectangular configuration, and which includes end walls 14, side walls 15, a top wall 16, and a bottom wall 17. It will be noted that one of the side walls 15 has an access opening 18 therein, which is closed by a substantially rectangular-shaped closure panel 19, which is secured to the associated side wall by bolts or the like. It will further be noted that the access opening 18 is larger than the closure panel 19 so that an opening is defined below the lower edge of the closure panel. This opening accommodates a generally rectangular-shaped upwardly opening tray or drawer 20, which is slidable upon the bottom wall 17, and which engages the end walls and opposed side walls, as best seen in FIG. 2. The tray 20 is provided with handles 21 to facilitate removal and insertion of the tray with respect to the filter housing 13.

The filter housing 13 is provided with a plurality of caster wheel assemblies 22, which are secured to the bottom wall 17 thereof, to permit the primary filter unit 11 to be readily moved from one location to another. It will be seen that one of the end walls 14 of the filter housing is provided with an inlet opening 23 therein adjacent the lower wall thereof, and a cylindrical inlet fitting 23a is secured to the end wall in communicating relation with the opening 23 and projects outwardly therefrom. The other end wall 14 is provided with an outlet opening 24 therein adjacent the top wall 16 thereof, and a generally cylindrical outlet fitting 24a is secured to the end wall in communicating relation with the opening 24 and projects outwardly therefrom.

One end of an elongate, flexible vacuum inlet hose 25 is secured to the fitting 23a thereof, as best seen in FIG. 1. The other end of the inlet vacuum hose 25 is connected in communicating relation to a heating, ventilation, or air conditioning duct to be cleaned. One end of an elongate, flexible vacuum outlet hose 26 is connected to the fitting 24a so that the hose 26 communicates with the opening 24. The other end of the hose 26 is connected in communicating relation to the blower and final filter unit 12.

Referring again to FIG. 1, it will be seen that both of the end walls 14 are provided with handles 27 to facilitate movement of the primary filter unit from one location to another. Referring now to FIG. 2, it will be seen that the interior of the filter housing 13 is provided with a horizontally disposed divider and filter support plate or wall 30 that divides the interior of the filter housing into a lower filter chamber 28 and an upper plenum chamber 29. It will be noted that the lower filter chamber 28 communicates with the vacuum inlet hose 25 through the inlet opening 23, and the plenum chamber 29 communicates with the vacuum outlet hose 26 by means of the outlet opening 24.

The divider and filter support plate 30 has a plurality of substantially identically sized circular openings 31 therein for accommodating the upper end portion of a plurality of vertically disposed cylindrical filter members or socks 32. These filter socks 32 are formed of polyester sateen and project into the plenum chamber 29 from a point located just above the tray 20. Each sock has an open upper end, a closed lower end wall 32a, and a cylindrical wall 32b. In the embodiment shown, fifteen of the sock filters 32 are provided and are arranged in side-by-side relation with respect to each other.

The open upper end of each sock filter is secured to the divider plate or wall 30 by means of a flexible resilient annular attachment ring 35. Each ring 35 has an outwardly opening annular groove 36 therein. Each ring is inserted into the upper end of a sock filter and is then squeezed and inserted into a circular opening 31 by the divider plate so that each attachment ring clamps the upper portion of a sock filter against the circumferential edge defining an opening. With this arrangment, each sock filter is sealingly secured to the divider plate 30, and the only means of communication between the filter chamber and plenum chamber is through the sock filters 32.

Each sock filter 32 has a porous cylindrical filter cage 37 inserted therein to prevent the sock filter from collapsing during operation of the apparatus. The filter cages 37 are of cylindrical configuration, and are formed of hardware cloth and maintain the sock filters in an open, non-collapsed condition. It has been found that the polyester sateen sock filters 32 are of the correct weight and porosity to permit removal of substantially all of the air entrained particles directed into the filter housing. In this regard, if the sock filters were formed of lighter weight material, excessive dust contamination would be directed into the blower and final filter unit, while sock filters formed of heavier or denser material would cause excessive pressure buildup, thereby lowering the intake air volume. Further, the use of heavier, denser material to form the sock filters would also result in premature clogging of the sock filters. The polyester sateen sock filters not only allow the intake air volume to be readily moved through the walls of the sock filters to remove the air entrained particles therefrom, but the slippery surface properties of the polyester sateen allow the particles to readily fall therefrom into the collection tray 20.

After the air has been directed through the sock filter 32 and into the plenum chamber 29, the air is then directed through the outlet vacuum hose 26 into the blower and final filter unit 12. The blower and final filter unit 12 includes a blower unit housing 38 formed of aluminum and including opposed end walls 39, opposed side walls 40, and a bottom wall 41. One of the side walls 40 has an access opening therein, which is closed by a closure panel 40a, which is secured to the associated side wall by suitable bolts or the like. A horizontal divider plate 60, having a pair of openings 60a therein, divides the interior of the blower and final filter unit into a lower fan chamber 42 and an upper final filter chamber 42a.

The end walls of the blower unit housing 38 are provided with inturned flanges 43, and the side walls 40 thereof are provided with inturned flanges 44. A final filter housing 45, of generally rectangular configuration, is positioned upon the blower unit housing 38 and includes opposed end walls 46 and opposed side walls 47. The final filter housing 45 has an open top 48, which defines an outlet and also has an open bottom 49, which defines an inlet communicating with the fan housing 42.

The interior of the final filter housing 45 accommodates a pair of generally rectangular-shaped high efficiency particulate air filter units 50, known in the trade as HEPA filters, which obstruct the outlet 48 and the inlet 49. In the embodiment shown, the end walls 46 of the final filter housing 45 are provided with inturned flanges 51, and the side walls 47 thereof are provided with inturned flanges 52. The HEPA filter units 50 are positioned upon the inturned flanges 51, 52, and the latter are positioned upon the inturned flanges of the blower unit housing 58. A suitable yieldable gasket 53 is interposed between the inturned flanges of the final filter housing 45 and the blower unit housing 48 to form a seal thereat. Suitable means are provided for detachably securing the final filter housing 45 to the blower unit housing 58. This means includes a plurality of lock members 54, each being pivotally secured to one of the inturned flanges 44 of the blower unit housing 38. The lock members are spring-urged and releasably engage the lock engaging members 55 secured to the side walls 47 of the final filter housing 45. When the lock members engage the lock engaging members, the gasket 43 is compressed between the inturned flanges of the blower unit housing and the final filter housing.

Referring now to FIG. 2, it will be seen that one of the end walls 39 of the blower unit housing 38 has an inlet opening 56 therein, and the end wall is provided with a cylindrical inlet fitting 56a communicating with the opening 56. The vacuum outlet hose 26 has its other end connected to the fitting 56a, which intercommunicates the fan chamber 42 with the plenum chamber 29 by means of the hose 26. The fan housing chamber 42 has a pair of blower or fan devices 57 positioned therein, each including a fan housing 58, having an inlet 59 and an upwardly facing outlet 60 for directing air from the fan housing through the inlet opening 49 of the final filter housing 45.

The final filter housing 45 has an inwardly projecting peripheral lip 45a integral with the end and side walls thereof, as best seen in FIG. 5. A plurality of vertically disposed rods 45b are welded to the lower surface of the peripheral lip 45a and project downwardly therefrom. When the HEPA filters 50 are inserted into the final filter housing 45, the final filter housing 45 is first inverted and the filters 50 are positioned in the housing and engage a gasket 50a, which is positioned against the inwardly projecting peripheral lip 45a of the final filter housing.

A pair of substantially flat straps 50b are positioned against the lower surfaces of the HEPA filters, and each is provided with openings therein that accommodate the lower ends of the rods 45b therethrough. The lower ends of these rods 45b are threaded and are threadedly engaged by nut and washer assemblies 50c to clamp the HEPA filters and gasket 50a against the inner peripheral lip 45a of the final filter housing. A perforated grill 45c is spot-welded to the inturned lip 45a of the final filter housing and serves to protect the upper surface of the HEPA filters.

When the final filter housing 45 is secured to the blower housing 38, a yieldable gasket 53 is positioned upon the inturned flanges 43 and 44 of housing 38. The final filter housing is positioned upon the blower unit housing 58 so that the inturned flanges 51 and 52 of the final filter housing engage a suitable yieldable gasket 53. Releasable locking means secure the final filter housing to the blower housing.

This locking means includes a plurality of lock members 54, each being pivotally secured to one of the inturned flanges 44 of the blower unit housing 38. The lock members are of conventional spring-urged construction and releasably engage lock engaging members 55 secured to the side walls 47 of the final filter housing 45 to secure the latter to the blower unit housing 38 and to compress the gasket 53 between the housings.

Referring now to FIGS. 2, 3, and 4, it will be seen that air directed from the plenum chamber 29 through the conduit hose 26 passes through an opening 56 and into the fan housing 42. The end of the hose 26 is connected to a fitting 56a, which communicates with the opening 56. The fan housing chamber 42 has a pair of blower or fan devices 57 positioned therein, each including a fan housing 58 having an inlet 59 and an upwardly facing outlet 60 for directing air from the fan housing to the final filter chamber 42a. There is a pressure differential between the fan chamber 42 and the final filter chamber 42a. The pressure across the HEPA filters in the final filter chamber 42a is positive, while the pressure in the fan chamber is negative. The rotary fan 62 for each fan device 57 is driven by an electrical motor 61 having a control unit 61a electrically connected thereto and controlling operation thereof.

Each of the fan devices or blowers 57 has an output of 2,000 cfms and produces a total combined output of 4,000 cfms. Each of the electric motors 61 of the fan or blower devices is a 5 h.p. single-phase motor operating at 3,450 rpms on 220 volts.

Figure 7:
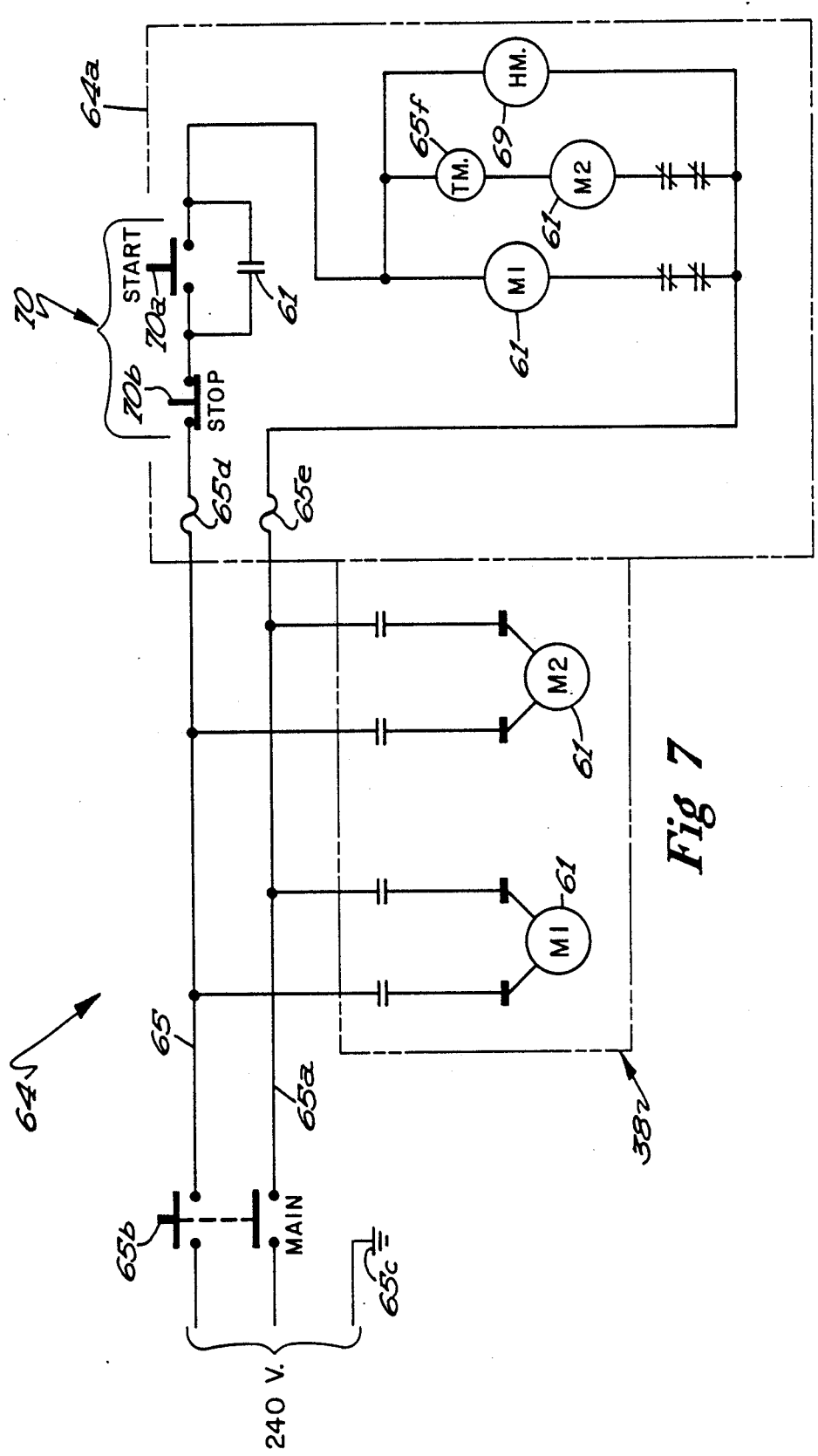
FIG. 7 is an electrical schematic diagram of the circuitry used for the blower system.

The electrical circuitry, designated generally by the reference numeral 64, for operating the blower system is illustrated in FIG. 7. Some of the components are contained in a housing 64a, which is mounted on the blower unit housing 38. The circuitry 64 includes the main line conductors 65 and 65a, which are connected to a 240-volt electrical source and to ground 65c. A main line switch 65b allows the current to the blower system to be selectively opened and closed. It will be noted that the electrical motors 61 for the rotary fans 62 are connected in parallel and the conductors 65 and 65a are provided with conventional fuses 65d and 65e. A single on/off switch 70 is comprised of switch contacts 70a for start and switch contacts 70b for stop. A timer 65f is electrically connected across one of the electrical motors 61 to thereby permit the electric motors to sequentially start to avoid electrical surges during the initiation of the operation of the blower system.

The blower and final filter unit 12 is also provided with caster wheels 68 to facilitate movement of the unit from one location to another. It will also be seen that the primary filter unit 11 has a magnehelic gauge 67, which senses the pressure drop across the sock filters 32 of the primary filter unit 11. The blower and final filter unit 12 is also provided with a magnehelic gauge 69 for sensing pressure drop across the HEPA filters 50.

Figure 6:
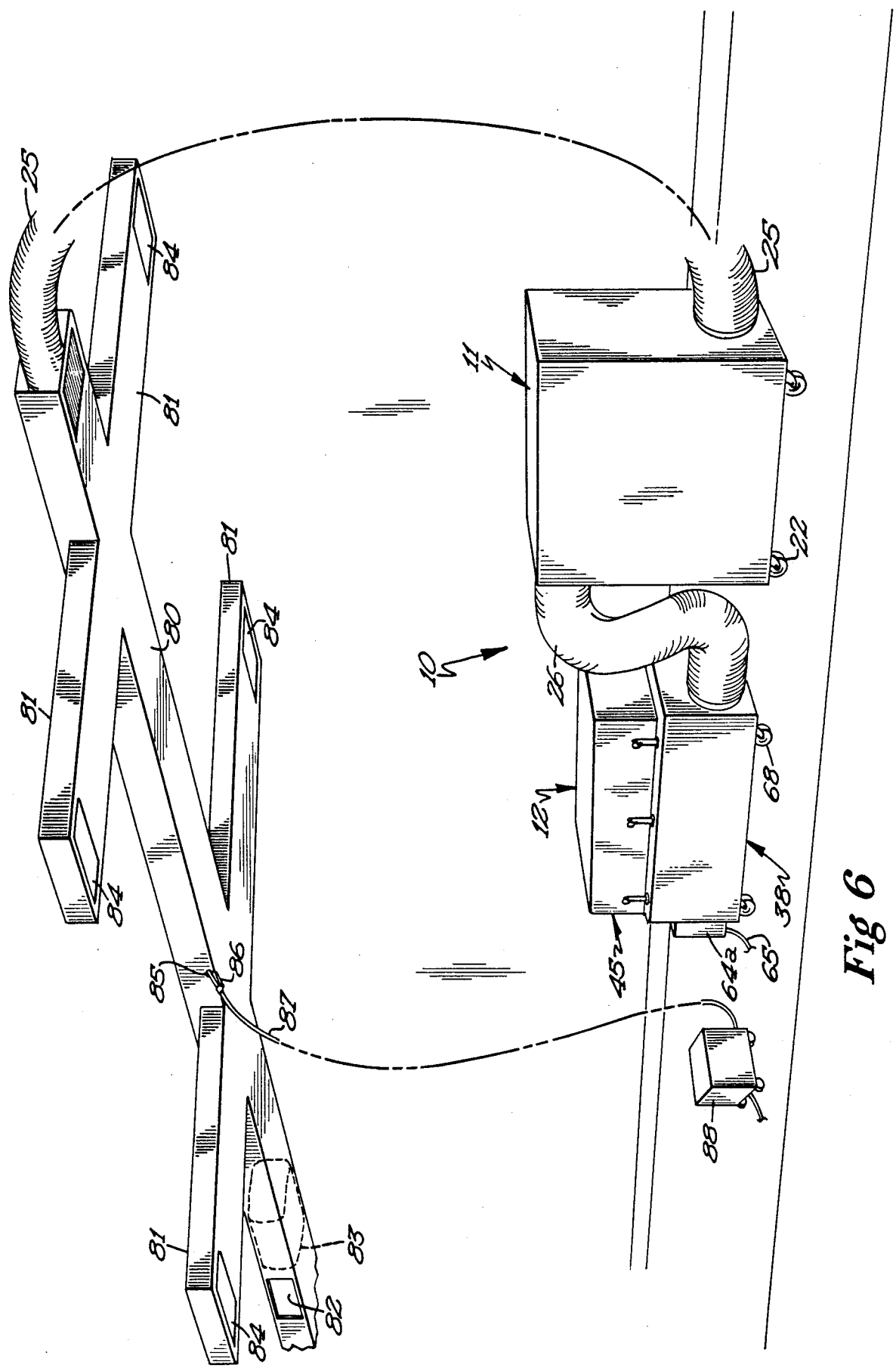
FIG. 6 is a diagrammatic view illustrating a manner of use of the apparatus.

Referring now to FIG. 6, it will be seen that the novel apparatus has been diagrammatically illustrated for cleaning a conventional duct system of a heating, ventilation, or air conditioning apparatus. In use, the duct cleaning apparatus 10 will be moved to the selected area in which the ducts of the air handling system are to be cleaned. Typically, the ducts will be cleaned from the supply end of the duct system towards the more remote portions thereof.

The duct cleaning apparatus 10 is moved to the desired location, and the conduit or hose 25 is connected in sealing relation to the main duct line 80. In order to effectively isolate the portions to be cleaned, an isolation inflatable member 83 is positioned in the main duct line 80 and inflated to seal off the selected portion. In the embodiment shown, the cleaning operation will not only include a portion of the main line 80, but also certain branch lines 81. The inflatable isolation member or bag 83 may be inserted through an access door 82 in the main duct line or through an opening formed in the main duct line. The outlets or grills 84 for the branch lines 81 will be closed with cheesecloth in some instances and with Polyethylene film in other instances. One-inch openings 85 will be sequentially drilled in a main line to permit the insertion of an air nozzle 86 therethrough. The air nozzle 86 is connected by a flexible conduit 87 to an air compressor device 88 so that blasts of air may be directed into the duct to loosen the grime and contaminating material which adheres to the inner surface of the duct. The compressor 88 is preferably a single-phase electric air compressor capable of producing 175 psi. The nozzle 86 is omni-directional, and the air blasts will be directed in the areas needed to loosen the contaminating material. Each opening 85 will be closed and sealed by the operator as the cleaning operation continues.

After the material has been loosened, the duct cleaning apparatus will be energized by closing the on/off switch 70. The blower or fan devices 57 will each produce 2,000 cfm, for a total of 4,000 cfm. The contaminating material, after being loosened by the air blasts, will be entrained in a stream of air and will be directed through the conduit 25. This air entrained material, moving at approximately 4,000 cfms, will be directed into the primary filter housing and, specifically, into the filter chamber 28.

This contaminated air stream will be directed through the walls of the sock filters 32 and upwardly into the plenum chamber 29. These sock filters 32 are each approximately 8 inches in diameter and approximately 42 inches long. Most of the air entrained particulate material will be removed by these sock filters, and a substantial amount of this material will fall into the collection tray 20. The magnehelic gauge 67 will constantly monitor the pressure drop across these sock filters in the plenum chamber to indicate to an operator whether or not the sock filters are becoming clogged. It has been found that well over 90% of the particulate material will be removed by the sock filters 32, so that only extremely fine material will continue in the air stream through the plenum chamber 29. In the embodiment shown, particles of a smaller micron magnitude will probably pass through the sock filters and will be subsequently removed by the HEPA filters, which are rated at 99.97%, efficient at 0.3 microns.

Any of the remaining air entrained contaminant material will pass through the conduit 26 and into fan housing 42 and will be discharged through the outlet 60 thereof towards the HEPA filter units 60. In order to provide uniform distribution and to avoid damage to the HEPA filters, a generally flat deflector or dispersion member 71 is positioned over the outlet 70 of each blower fan unit. The deflector member 71 has a plurality of openings 72 throughout substantially the entire area thereof through which the air is dispersed and diffused. This air will, therefore, be uniformly distributed over the surface of the associated HEPA filter unit. In the embodiment shown, each deflector member 71 has a downturned flange 73 terminating in an outturned flange 74, which may be secured to the inturned flange 44 of the blower housing 38. The deflector member is spaced slightly above the outlet 60 of the associated fan device and effectively disperses the air directed therefrom. If the main duct 80 contains in-line heating or cooling coils, this area will be isolated by a pair of inflatable members 83, and the coils will be power-washed by a source of water under pressure. The wall of the duct will be provided with an opening to permit the cleaning water to be removed therefrom into a suitable container, such as a pan or the like. After each section of the duct has been cleaned, any openings made in the duct for the purposes of cleaning the duct will be neatly patched and resealed. The air, which is evacuated from the HEPA filter units back into the building, will be thoroughly cleaned and substantially all contaminant, including debris, particulates, asbestos fibers, pathogens, fungi, and the like, will be removed therefrom by the HEPA filter. The apparatus is also used for HVAC cleaning in asbestos abatement projects, but, in this type of operation, the sock filters 32 must be disposed of after each operation.

From the foregoing description, it will be seen that we have provided a novel portable duct cleaning system, which may be readily moved from one location to another, but which is highly effective in cleaning and removing debris, particulates, asbestos fibers, pathogens, fungi, and the like from the ducts.

Thus, it will be seen that we have provided a novel duct cleaning process and apparatus which functions in a more efficient manner than any heretofore known comparable apparatus and process.

What is claimed is:

1. A portable apparatus for cleaning ducts of heating, ventilation, and air conditioning systems in buildings, comprising:
   a filter housing, wheel elements secured to said housing for supporting the latter for movement over a surface,
   a horizontal divider wall in said housing dividing the interior of the latter into a lower filter chamber and an upper plenum chamber, said divider wall having a plurality of openings therein,
   an inlet opening in said filter housing communicating with said filter chamber, an elongate vacuum hose having one end thereof connected in communicating relation with said inlet having its other end thereof for connection in communicating relation with a duct to be cleaned,
   a plurality of similar vertically disposed cylindrical filter elements, each having a closed lower end and an open upper end secured to said divider wall in one of said openings and depending therefrom into said filter chamber,
   an outlet opening in said filter housing, means communicating with said plenum chamber,
   a blower unit housing having an interior defining a fan chamber and having an inlet opening therein communicating with said fan chamber, a fan device positioned in said fan chamber and having an inlet and outlet, wheel elements secured to said blower unit housing for supporting the latter for movement over a surface,
   conduit means interconnecting the outlet of said plenum chamber with the inlet opening of said fan housing,
   a final filter housing positioned upon said blower unit housing and being detachably secured thereto, a high efficiency particulate air filter positioned within said final filter housing and being disposed in close proximity to the outlet of said fan device whereby air from the latter will be directed through said high efficiency particulate air filter.

2. The apparatus as defined in claim 1 and a second fan device positioned within said fan chamber of said blower unit housing.

3. The apparatus as defined in claim 1 and a perforated deflector member positioned adjacent, but spaced from, said fan device outlet and uniformly dispersing the air stream discharged from said fan device outlet toward said high efficiency particulate filter.

4. The apparatus as defined in claim 1 and a removable tray positioned in said primary filter chamber below said cylindrical filter elements for receiving contaminant material from the latter.

5. The apparatus as defined in claim 1 wherein said cylindrical filter elements in said primary filter housing are formed of a flexible material.

6. The apparatus as defined in claim 5 and a plurality of perforate, cylindrical cage members, each being positioned within one of said filter elements to maintain the latter in a cylindrical configuration.

* * * * *